(12) United States Patent
Jeong et al.

(10) Patent No.: US 12,101,046 B2
(45) Date of Patent: Sep. 24, 2024

(54) MOTOR DRIVING APPARATUS

(71) Applicants: Hyundai Motor Company, Seoul (KR); Kia Corporation, Seoul (KR)

(72) Inventors: Kang Ho Jeong, Siheung-si (KR); Myung Ho Kim, Incheon (KR); Sang Cheol Shin, Yongin-si (KR); Young Seul Lim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 13 days.

(21) Appl. No.: 17/985,405

(22) Filed: Nov. 11, 2022

(65) Prior Publication Data

US 2023/0283214 A1   Sep. 7, 2023

(30) Foreign Application Priority Data

Mar. 4, 2022   (KR) .................... 10-2022-0028375

(51) Int. Cl.
  *H02P 1/00*  (2006.01)
  *H02P 25/18*  (2006.01)

(52) U.S. Cl.
  CPC .................. *H02P 25/188* (2013.01)

(58) Field of Classification Search
  CPC .......... H02P 27/08; H02P 25/18; H02P 27/06; H02P 25/188; H02P 15/184
  See application file for complete search history.

(56) References Cited

U.S. PATENT DOCUMENTS

| | | | |
|---|---|---|---|
| 6,304,045 B1 | 10/2001 | Muszynski |
| 9,906,183 B1 | 2/2018 | Agirman |
| 10,581,361 B2 | 3/2020 | Chen et al. |
| 2009/0033253 A1 | 2/2009 | Nagashima et al. |
| 2017/0310263 A1 | 10/2017 | Namuduri et al. |
| 2020/0059189 A1 | 2/2020 | Ohashi |

FOREIGN PATENT DOCUMENTS

| | | |
|---|---|---|
| CN | 103281034 A | 9/2013 |
| CN | 104167975 A | 11/2014 |

(Continued)

OTHER PUBLICATIONS

Search Report issued on Jul. 18, 2023 in corresponding European patent application No. 22207363.7.

(Continued)

*Primary Examiner* — Karen Masih
(74) *Attorney, Agent, or Firm* — Morgan, Lewis & Bockius LLP

(57) ABSTRACT

A motor driving apparatus which drives a motor including a plurality of winding portions corresponding to a plurality of phases, respectively, includes a motor including a plurality of winding portions corresponding to a plurality of phases, respectively, a first inverter including a plurality of first switching elements and electrically connected to a first end of each of the winding portions, a second inverter including a plurality of second switching elements and electrically connected to a second end of each of the winding portions, a plurality of third switching elements including first ends electrically connected to the second ends of the plurality of winding portions, respectively, and second ends electrically connected to each other, and a controller.

13 Claims, 7 Drawing Sheets

(56) References Cited

FOREIGN PATENT DOCUMENTS

| CN | 111034024 B | * | 9/2023 | ........... B62D 5/0421 |
|----|----|----|----|----|
| DE | 10 2010 060 380 B3 | | 2/2012 | |
| JP | 2016-048997 A | | 4/2016 | |
| JP | 6285256 B2 | | 2/2018 | |
| JP | WO2017-187577 A1 | | 7/2018 | |
| JP | 2020-058176 A | | 4/2020 | |
| JP | WO2021-019608 A1 | | 9/2021 | |
| KR | 10-2018-0059592 A | | 6/2018 | |
| KR | 10-2020-0035842 A | | 4/2020 | |
| KR | 10-2021-0122343 A | | 10/2021 | |

OTHER PUBLICATIONS

Swamy M M et al: "Extended high speed operation via electronic winding change method for ac motors", Industry Applications Conference, 2004. 39th IAS Annual Meeting. Confe Rence Record of the 2004 IEEE Seattle, WA, USA Oct. 3-7, 2004, Piscataway, NJ, USA, IEEE, vol. 1, Oct. 3, 2004 (Oct. 3, 2004), pp. 608-614, XP010735274.
Sin Stanislav et al: "Operation Method of Non-Salient Permanent Magnet Synchronous Machine for Extended Speed Range", IEEE Access, IEEE, USA,vol. 8, Jun. 4, 2020 (Jun. 4, 2020), pp. 105922-105935, XP011793017.
Im Seong-Hwan et al: "Novel Winding Changeover Method for A High Efficiency AC Motor Drive", 2019 IEEE Energy Conversion Congress and Exposition (ECCE), IEEE, Sep. 29, 2019 (Sep. 29, 2019), pp. 2347-2352, XP033666358.
Extended European Search Report issued on Jul. 18, 2023 in corresponding European patent application No. 22207363.7.

\* cited by examiner

MOTOR DRIVING APPARATUS

CROSS REFERENCE TO RELATED APPLICATION

The present application claims priority to Korean Patent Application No. 10-2022-0028375, filed Mar. 4, 2022, the entire contents of which is incorporated herein for all purposes by this reference.

BACKGROUND OF THE PRESENT DISCLOSURE

Field of the Present Disclosure

The present disclosure relates generally to a motor driving apparatus. More particularly, the present disclosure relates to a motor driving apparatus in which, according to a required output of a motor, a motor drive mode may be changed into a Y-connection motor drive mode and an open end winding motor drive mode, and the inductance of each of the windings of the motor may be changed to enable efficient motor driving.

Description of Related Art

Generally, first ends of phase windings included in a motor are electrically connected to one inverter, and second ends thereof are electrically connected to each other to form Y connection.

When the motor is driven, a switching element in the inverter is turned ON/OFF by pulse width modulation control and generates torque by applying a line voltage to the windings of the Y-connected motor to generate an alternating current.

The fuel efficiency of an eco-friendly vehicle such as an electric vehicle which utilizes torque generated by the motor as power is determined by the power conversion efficiency of the inverter and motor, and thus it is important to maximize the power conversion efficiency of the inverter and the motor.

The efficiency of an inverter and motor system is mainly determined by the voltage utilization rate of an inverter. When the driving point of a vehicle determined by the relationship of a motor speed to torque is formed in the section in which the voltage utilization rate is high, the fuel efficiency of the vehicle may be improved.

However, as the number of windings of the motor is increased to increase the maximum torque of the motor, the section with the high voltage utilization rate becomes far from a low-torque region, which is the main driving point of a vehicle, which may deteriorate the fuel efficiency of the vehicle. Furthermore, in the case of a design made to include the main driving point in a section with a high voltage utilization rate in terms of fuel efficiency, there is a limit to the maximum torque of the motor, which may deteriorate the acceleration start performance of the vehicle.

As a motor driving technology that can improve system efficiency while covering both low and high output sections with one motor is required in the art, recently, a technology for driving one motor in two different modes by use of two inverters and a mode change switch has been introduced.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a motor driving apparatus in which, according to required output of a motor, a motor drive mode is changed into a Y-connection motor drive mode and an open end winding motor drive mode to improve inverter efficiency for driving the motor and to change the inductance of the motor.

Technical objectives to be achieved in the present disclosure are not limited to the technical objectives mentioned above, and other technical objectives not mentioned will be clearly understood by those skilled in the art to which the present disclosure belongs from the following description.

In various aspects of the present disclosure, there is provided a motor driving apparatus including: a motor including a plurality of winding portions corresponding to a plurality of phases, respectively: a first inverter including a plurality of first switching elements and electrically connected to a first end of each of the winding portions: a second inverter including a plurality of second switching elements and electrically connected to a second end of each of the winding portions: a plurality of third switching elements including first ends electrically connected to the second ends of the plurality of winding portions, respectively, and second ends electrically connected to each other; and a controller, wherein each of the winding portions may include: a plurality of coils, and a plurality of fourth switching elements configured to change connection state between the plurality of coils, and the controller may be configured to control ON/OFF states of the plurality of first switching elements, the plurality of second switching elements, the plurality of third switching elements and the plurality of fourth switching elements based on at least one of a required output, a required torque, and a required speed of the motor.

For example, the controller may be configured to control the plurality of fourth switching elements so that the plurality of coils is connected in parallel or in series with each other.

For example, each of the winding portions may include a first coil and a second coil located between first and second ends of a corresponding winding portion and connected in parallel with each other, and the plurality of fourth switching elements may include: a 4-1 switching element located between the first coil and the second end and connected in series with the first coil: a 4-2 switching element located between the first end and the second coil and connected in series with the second coil: and a 4-3 switching element including a first end electrically connected to a position between the first coil and the 4-1 switching element, and including a second end electrically connected to a position between the 4-2 switching element and the second coil.

For example, when connecting the plurality of coils in parallel with each other, the controller is configured to control the 4-1 switching element and the 4-2 switching element to be turned on, and is configured to control a 4-3 switching element to be turned off.

For example, when connecting the plurality of coils in series with each other, the controller is configured to control the 4-1 switching element and the 4-2 switching element to be turned off, and is configured to control the 4-3 switching element to be turned on.

For example, when the required torque is higher than a preset torque standard and the speed is a preset speed standard or less than the preset speed, the controller may turn off the plurality of third switching elements and may control the fourth switching elements so that the plurality of coils is connected in series with each other, and may drive the motor by performing pulse width modulation control of the plurality of first switching elements.

For example, when the required torque is a preset torque standard or less than the preset torque standard, the required output is higher than a preset output standard, and the speed is a preset speed standard or less than the preset speed, the controller may turn off the plurality of third switching elements and may control the fourth switching elements so that the plurality of coils is connected in parallel with each other, and may drive the motor by performing pulse width modulation control of the plurality of first switching elements.

For example, when the required torque is higher than a preset torque standard, the required output is higher than a preset output standard, and the speed is higher than a present speed standard, the controller is configured to turn on the plurality of third switching elements and is configured to control the fourth switching elements so that the plurality of coils is connected in series with each other, and drives the motor by performing pulse width modulation control of each of the first switching elements and the plurality of second switching elements.

For example, when the required torque is a preset torque standard or less than the preset torque standard, the required output is higher than a preset output standard, and the speed is higher than a present speed standard, the controller may turn on the plurality of third switching elements and may control the fourth switching elements so that the plurality of coils is connected in parallel with each other, and may drive the motor by performing pulse width modulation control of each of the first switching elements and the plurality of second switching elements.

For example, each of the fourth switching elements may selectively allow or block bidirectional current flows between both the ends thereof.

According to the motor driving apparatus, the inductance of each of the windings of the motor is changed by changing the connection state of the windings of the motor based on speed, required output, and required torque of a motor, and switching between Y-connection motor drive mode and the open end winding motor drive mode is performed, improving power performance and facilitating more efficient driving.

Effects obtained from the present disclosure are not limited to effects described above, and other effects not described above will be clearly appreciated from the following description by those skilled in the art.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
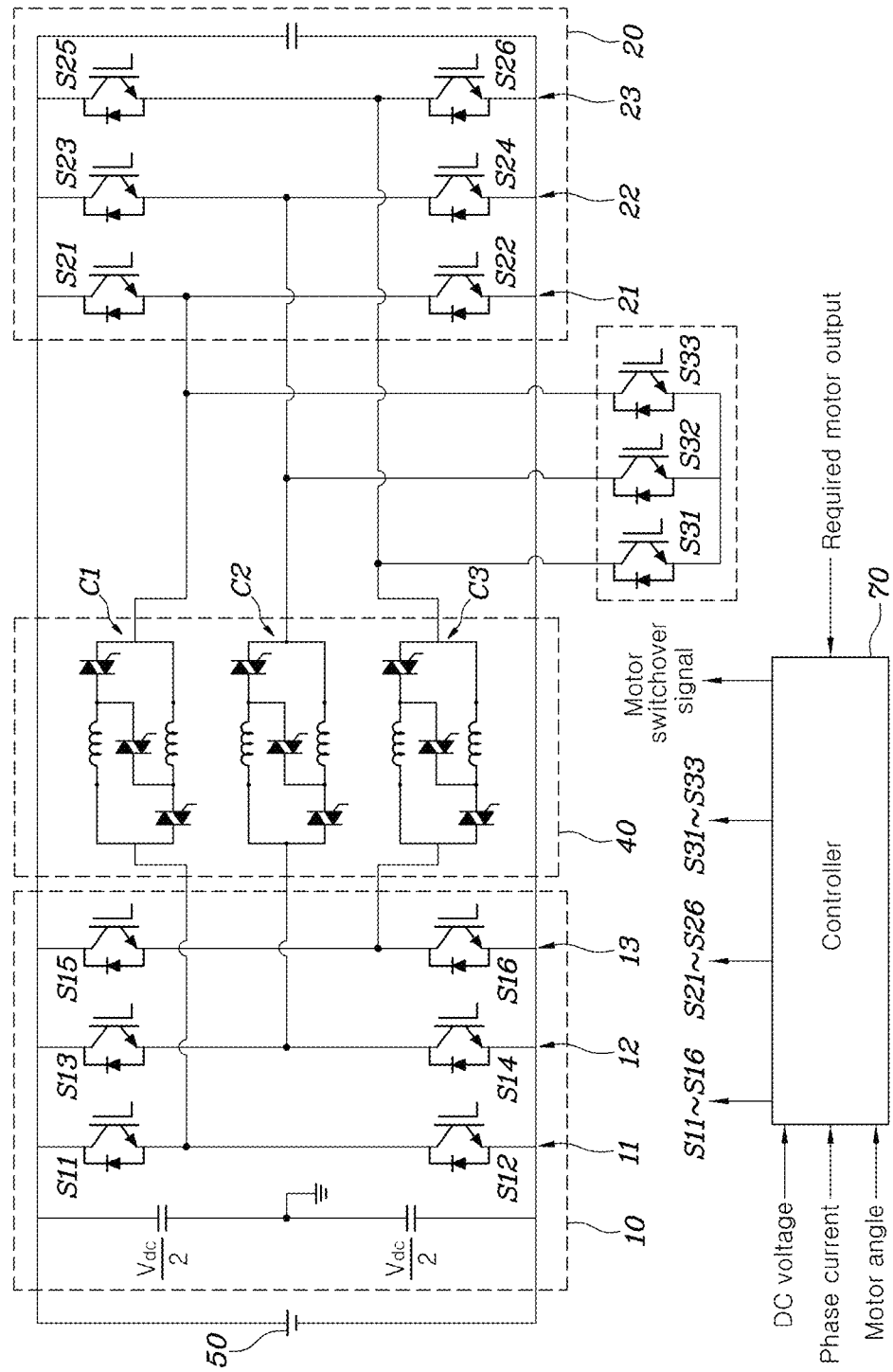
FIG. 1 is a circuit diagram of a motor driving apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION OF THE PRESENT DISCLOSURE

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, an exemplary embodiment included in the present specification will be described in detail with reference to the accompanying drawings, but the same or similar components are assigned the same reference numbers, and redundant description thereof will be omitted. The terms "module" and "part" for the components used in the following description are provided or mixed in consideration of only the ease of writing the specification, and do not have distinct meanings or roles by themselves. In addition, when it is determined that detailed descriptions of related known technologies may obscure the gist of the exemplary embodiment included in the present specification in describing the exemplary embodiment included in the present specification, the detailed description thereof will be omitted. Furthermore, the accompanying drawings are only for easily understanding the exemplary embodiment included in the present specification, and the technical idea included herein is not limited by the accompanying drawings, and the present disclosure may be construed as covering modifications, equivalents, and alternatives falling within ideas and technical scopes of the present disclosure.

Terms including an ordinal number, such as first and second, etc., may be used to describe various components, but the components are not limited by the terms. The above terms are used only for distinguishing one component from another.

When a component is referred to as being "coupled" or "connected" to another component, it should be understood that the component may be directly coupled or connected to the another component or intervening components may be present therebetween. In contrast, when a component is referred to as being "directly coupled" or "directly connected" to another component, it should be understood that there is no intervening component present therebetween.

Singular forms are intended to include plural forms as well, unless the context clearly indicates otherwise.

In the present specification, it should be understood that terms such as "comprises" or "have" are intended to designate that features, numbers, steps, operations, components, parts, or combinations thereof described in the specification exist, but do not preclude the possibility of the existence or addition of one or more other features, numbers, steps, operations, components, parts, or combinations thereof.

Furthermore, a unit or control unit included in the names of a motor control unit (MCU) and a hybrid control unit (HCU) is only a term widely used in the naming of a controller that controls a specific function of a vehicle, and does not mean a generic function unit. For example, for the control of functions for which each controller is responsible, the controller may include a communication device which communicates with other controllers or sensors, a memory which stores an operating system, logic commands, and input and output information, etc., and at least one processor which performs judgment, calculation, and determination necessary for controlling functions in charge.

FIG. 1 is a circuit diagram of a motor driving apparatus according to the exemplary embodiment of the present disclosure.

Referring to FIG. 1, the motor driving apparatus according to the exemplary embodiment of the present disclosure, which supplies driving power to the motor 40 including a plurality of winding portions C1, C2 and C3 corresponding to a plurality of phases, respectively, may include: a first inverter 10 including a plurality of first switching elements S11, S12, S13, S14, S15 and S16 and electrically connected to a first end of each of winding portions of the motor 40; a second inverter 20 including a plurality of second switching elements S21, S22, S23, S24, S25 and S26 and electrically connected to a second end of each of the winding portions of the motor 40: a plurality of third switching elements S31, S32 and S33 whose first ends are electrically connected to the second ends of the winding portions of the motor 40, respectively, and second ends electrically connected to each other: and a controller 70 which is configured to control the ON/OFF state of each of the first switching elements S11, S12, S13, S14, S15 and S16, the second switching elements S21, S22, S23, S24, S25 and S26, and the third switching elements S31, S32 and S33 connected to the controller 70, and the internal connection state of each of the winding portions C1, C2 and C3 of the motor 40 based on the required output of the motor 40.

The first inverter 10 and the second inverter 20 may convert DC power stored in a battery 50 into three-phase AC power to provide the three-phase AC power to the motor 40, or may convert regenerative braking energy generated by generation of regenerative braking torque of the motor 40 during regenerative braking into DC power and provide the DC energy to the battery 50. These conversions between DC power and AC power are performed by pulse width modulation control of the plurality of first switching elements S11, S12, S13, S14, S15 and S16 and the plurality of second switching elements S21, S22, S23, S24, S25 and S26 provided in the first inverter 10 and the second inverter 20, respectively.

The first inverter 10 may include a plurality of legs 11, 12 and 13 to which a DC voltage formed in a DC link capacitor located between the opposite ends of the battery 50 to be connected thereto is applied. The legs 11, 12 and 13 correspond to a plurality of phases of the motor 40, respectively, to form an electrical connection therebetween.

A first leg 11 includes two switching elements S11 and S12 connected in series with each other, and the connection node of the two switching elements S11 and S12 may be electrically connected to a first end of the winding portion C1 of one phase in the motor 40 so that AC power corresponding to the one phase of a plurality of phases is input/output. Likewise, a second leg 12 includes two switching elements S13 and S14 connected in series with each other, and the connection node of the two switching elements S13 and S14 may be electrically connected to a first end of the winding portion C2 of one phase in the motor 40 so that AC power corresponding to the one phase of the plurality of phases is input/output. Furthermore, a third leg 13 includes two switching elements S15 and S16 connected in series with each other, and the connection node of the two switching elements S15 and S16 may be electrically connected to a first end of the winding portion C3 of one phase in the motor 40 so that AC power corresponding to the one phase of the plurality of phases is input/output.

The second inverter 20 may also have a configuration similar to the configuration of the first inverter 10. The second inverter 20 may include a plurality of legs 21, 22 and 23 to which a DC voltage formed in a DC link capacitor located between the opposite ends of the battery 50 to be connected thereto is applied. The legs 21, 22 and 23 correspond to the plurality of phases of the motor 40, respectively, to form an electrical connection therebetween.

A first leg 21 includes two switching elements S21 and S22 connected in series with each other, and the connection node of two switching elements S21 and S22 may be electrically connected to the second end of the winding portion C3 of one phase in the motor 40 so that AC power corresponding to the one phase of the plurality of phases is input/output. Likewise, a second leg 22 includes two switching elements S23 and S24 connected in series with each other, and the connection node of the two switching elements S23 and S24 may be electrically connected to the second end of the winding portion C2 of one phase in the motor 40 so that AC power corresponding to the one phase of the plurality of phases is input/output. Furthermore, a third leg 23 includes two switching elements S25 and S26 connected in series with each other, and the connection node of the two switching elements S25 and S26 may be electrically connected to the second end of the winding portion C1 of one phase in the motor 40 so that AC power corresponding to the one phase of the plurality of phases is input/output.

The first inverter 10 is electrically connected to the first end of each of the winding portions C1, C2 and C3 of the motor 40, and the second inverter 20 is electrically connected to the second end of each of the winding portions C1, C2 and C3 of the motor 40. That is, the electrical connection of an open end winding method in which the opposite ends of the winding portions C1, C2 and C3 of the motor 40 are electrically connected to the first inverter 10 and the second inverter 20, respectively, may be formed.

The first ends of the plurality of third switching elements S31, S32 and S33 may be connected respectively to the second ends of the plurality of winding portions C1, C2 and C3 included in the motor 40, and the second ends thereof may be electrically connected to each other.

In such a connection structure, when the third switching elements S31, S32 and S33 are turned on, the second ends of the winding portions C1, C2 and C3 of the motor 40 are electrically connected to each other so that the motor 40 has a Y-connected winding structure including a neutral point. Accordingly, in the state in which the plurality of third switching elements S31, S32 and S33 is turned on, the second inverter 20 is deactivated (the plurality of second switching elements S21, S22, S23, S24, S25 and S26 is turned off), and only the first switching elements S11, S12, S13, S14, S15 and S16 of the first inverter 10 are switched through pulse width modulation control to drive the motor 40.

When the third switching elements S31, S32 and S33 are turned off, the opposite ends of the winding portions C1, C2 and C3 of the motor 40 are electrically connected to the first inverter 10 and the second inverter 20, respectively. Accordingly, in the state in which the plurality of third switching elements S31, S32 and S33 is turned off, the first inverter 10 and the second inverter 20 are activated, and the first switching elements S11, S12, S13, S14, S15 and S16 and the second switching elements S21, S22, S23, S24, S25 and S26 are switched through pulse width modulation control to drive the motor 40.

A mode of driving the motor 40 so that the third switching elements S31, S32 and S33 are turned on and electrically connected to the second end of each of the winding portions C1, C2 and C3 of the motor 40 and only the first inverter 10 is activated may be referred to as a closed end winding (CEW) mode or a Y-connection mode, and a mode of driving the motor 40 so that the third switching elements S31, S32 and S33 are turned off and both the first inverter 10 and the second inverter 20 connected respectively to the opposite ends of the winding portions C1, C2 and C3 of the motor 40 are activated may be referred to as an open end portion winding (OEW) mode.

Various switching means known in the art, such as a MOSFET, an IGBT, a thyristor, and a relay, etc. may be employed as the third switching elements S31, S32 and S33

The controller 70 is a component which switches the switching elements S11, S12, S13, S14, S15 and S16 and S21, S22, S23, S24, S25 and S26 included in the first inverter 10 and the second inverter 20, respectively, through pulse width modulation control thereof so that the motor 40 can drive based on at least one of the required output, required torque, and required speed (RPM) of the motor 40. In the implementation of the controller 70, the controller 70 may include a motor control unit (MCU) and a gate drive unit. In the instant case, the motor control unit (MCU) may transmit a control signal for each of the first inverter 10 and the second inverter 20 to the gate drive unit according to the command of a superior controller, and the gate drive unit may transmit a driving signal to each of the inverters 10 and 20 in response to the control signal. Here, the control signal and driving signal may be PWM signals, but are not necessarily limited thereto.

In various embodiments of the present disclosure, the controller 70 may determine the drive mode of the motor based on the required torque, required output, and speed of the motor 40, and accordingly, may determine the ON/OFF state of the third switching elements S31, S32 and S33 and the internal connection state of each of the winding portions C1, C2 and C3 of the motor 40, and may switch the switching elements of the inverters activated according to a drive mode through pulse width modulation control.

The internal connection state of each of the winding portions C1, C2 and C3 of the motor 40 and the change thereof will be described later in more detail with reference to FIG. 2, FIG. 3 and FIG. 4. First, motor driving according to the ON/OFF state of the third switching elements S31, S32 and S33 will be described.

According to preset conditions, without operating the second inverter 20, the controller 70 may perform the closed end winding mode of driving the motor 40 by performing pulse width modulation control of the switching elements S11, S12, S13, S14, S15 and S16 of the first inverter 10. In the instant case, the controller 70 may control the third switching elements S31, S32 and S33 so that the third switching elements S31, S32 and S33 are turned on. Accordingly, the second ends of the winding portions C1, C2 and C3 of the motor 40 are electrically connected to each other to form a Y connection.

Driving the motor in the closed end winding mode may be realized so that the controller 70 receives the DC voltage of the first inverter 10, a phase current supplied to the motor 40, and a motor angle detected by a motor rotor sensor provided in the motor 40 and performs the pulse width modulation control of the first switching elements S11, S12, S13, S14, S15 and S16 of the first inverter 10. Because various techniques for driving the motor 40 by performing pulse width modulation control of one inverter are already known in the associated art, further detailed description of the technique of the pulse width modulation control of the inverter performed in the closed end winding mode is omitted.

Meanwhile, according to preset conditions, the controller 70 may operate both the first inverter 10 and the second inverter 20 to drive the motor 40 in the open end winding mode. In the instant case, the controller 70 may control the third switching elements S31, S32 and S33 so that the third switching elements S31, S32 and S33 are turned off. Accordingly, the first end of each of the winding portions C1, C2 and C3 of the motor 40 is electrically connected to the first inverter 10, and the second end thereof is electrically connected to the second inverter 20, and the controller 70 may drive the motor 40 by performing the pulse width modulation control of the first inverter 10 and the second inverter 20.

Driving the motor in the open end winding mode may be realized so that the controller 70 receives the DC voltage of each of the first inverter 10 and the second inverter 20, a phase current supplied to the motor 40, and a motor angle detected by the motor rotor sensor provided in the motor 40 and performs the pulse width modulation control of both the first switching elements S11, S12, S13, S14, S15 and S16 of the first inverter 10 and the second switching elements S21, S22, S23, S24, S25 and S26 of the second inverter 20.

Hereinafter, the internal connection state of each of the winding portions C1, C2 and C3 of the motor 40 and the change thereof will be described with reference to FIG. 2, FIG. 3 and FIG. 4. In FIG. 2, FIG. 3 and FIG. 4, in describing a connection relationship between components, for convenience, a left side is referred to as a first end and a right side is referred to as a second end relative to an associated component.

Figure 2:
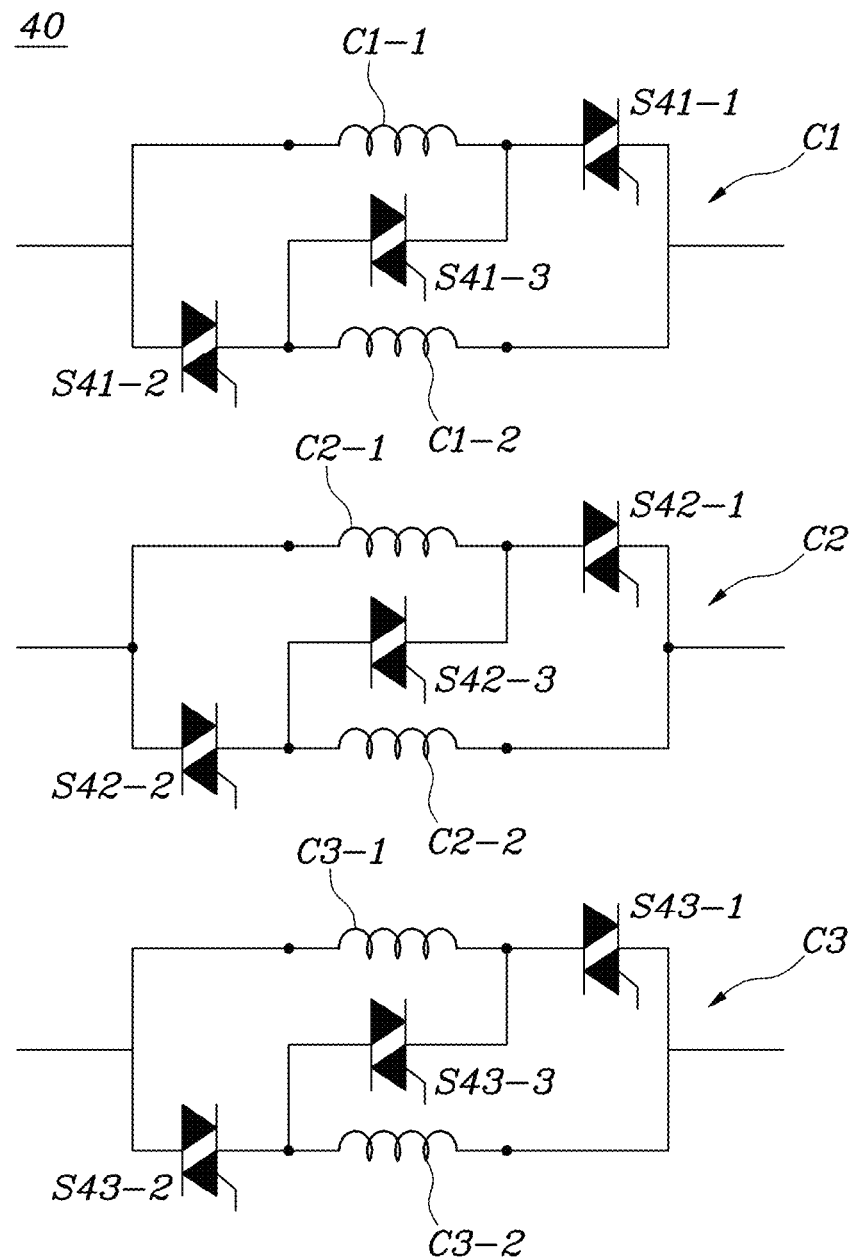
FIG. 2 is a circuit diagram of a motor according to the exemplary embodiment of the present disclosure.

FIG. 2 is a circuit diagram the motor of according to the exemplary embodiment of the present disclosure.

Referring to FIG. 2, the motor 40 may include a first winding portion C1, a second winding portion C2, and a third winding portion C3. The structures of the winding portions C1, C2 and C3 are similar to each other, so that the first winding portion C1 will be referred to as an example.

The first winding portion C1 may include a plurality of coils C1-1 and C1-2 connected in parallel with each other and a plurality of fourth switching elements S41-1, S41-2, and S41-3 which can change a connection relationship between the coils according to whether the fourth switching elements are turned ON/OFF.

A first coil C1-1 and a second coil C1-2 may be located between the first and second ends of the first winding portion C1 to be connected in parallel with each other. Additionally, a 4-1 switching element S41-1 may be located between the second end of the first coil C1-1 and the second end of the first winding portion C1 and may be connected in series with the first coil C1-1. A 4-2 switching element S41-2 may be located between the first end of the first winding portion C1 and the first end of the second coil C1-2 and may be connected in series with the second coil C1-2. Furthermore, the first end of a 4-3 switching element S41-3 may be electrically connected to a position between the first coil C1-1 and the 4-1 switching element S41-1, and the second end of the 4-3 switching element S41-3 may be electrically connected to a position between the second coil C1-2 and the 4-2 switching element S41-2.

In other words, between the first and second ends of the first winding portion C1, the first coil C1-1 and the 4-1 switching element S41-1 may be connected in series with each other, the 4-2 switching element S41-2 and the second coil C1-2 may be connected in series with each other, and the pair of first coil C1-1 and 4-1 switching element S41-1 and the pair of 4-2 switching element S41-2 and second coil C1-2 may be connected in parallel with each other.

Here, when each of the fourth switching elements S43-1, S43-2, and S43-3 is turned on, bidirectional current flows between the opposite ends of the winding portion may be allowed, and when each of the fourth switching elements S43-1, S43-2, and S43-3 is turned off, bidirectional current flows between the opposite ends of the winding portion may be blocked. For example, the plurality of fourth switching elements S43-1, S43-2, and S43-3 may be realized with Si, SiC, a thyristor, and a relay, etc., but this is illustrative and not necessarily limited thereto, and any type of switching elements which can selectively change whether to perform the current flows between the opposite ends may be applied.

The internal connection relationship of a first coil portion C1 described above may be applied to a connection relationship between the coils C2-1 and C2-2 and fourth switching elements S42-1, S42-2, and S42-3 of a second coil portion C2, and may be applied to a connection relationship between the coils C3-1 and C3-2 and the fourth switching elements S43-1, S43-2, and S43-3 of a third coil portion C3, so duplicate descriptions thereof will be omitted.

Next, a form in which coils of each of the winding portions C1, C2 and C3 provided inside the motor are connected in series or parallel with each other will be described with reference to FIG. 3 and FIG. 4. The change of connection state between the internal coils of each of the winding portions C1, C2 and C3 is performed in the same form, and thus to facilitate understanding, only the first winding portion C1 is illustrated in FIG. 3 and FIG. 4.

Figure 3:
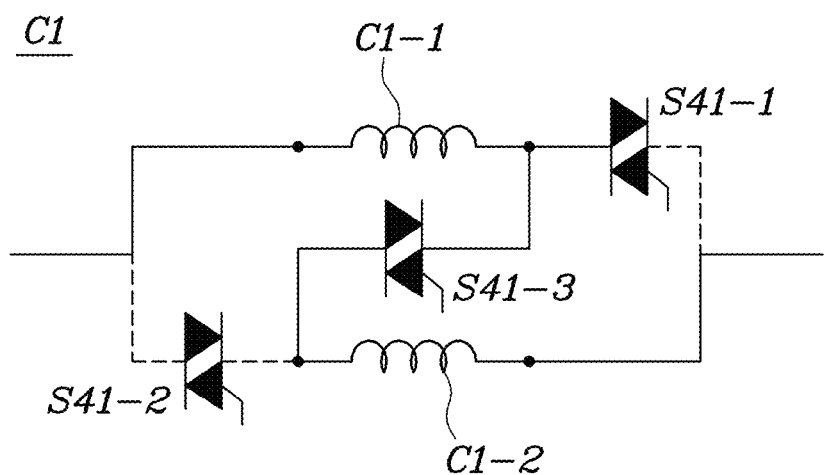
FIG. 3 shows a series connection state of the windings of the motor according to the exemplary embodiment of the present disclosure.

FIG. 3 shows a series connection state of the winding portion of the motor according to the exemplary embodiment of the present disclosure.

Referring to FIG. 3, when in the first winding portion C1, the 4-1 switching element S41-1 and the 4-2 switching element S41-2 are turned off and the 4-3 switching element S41-3 is turned on, two coils C1-1 and C1-2 may be connected in series with each other. Accordingly, in the instant state in the instant state, assuming that the inductance of each of the two coils C1-1 and C1-2 is the same, the inductance of the first winding portion C1 may be twice the inductance of one coil of the two coils.

Figure 4:
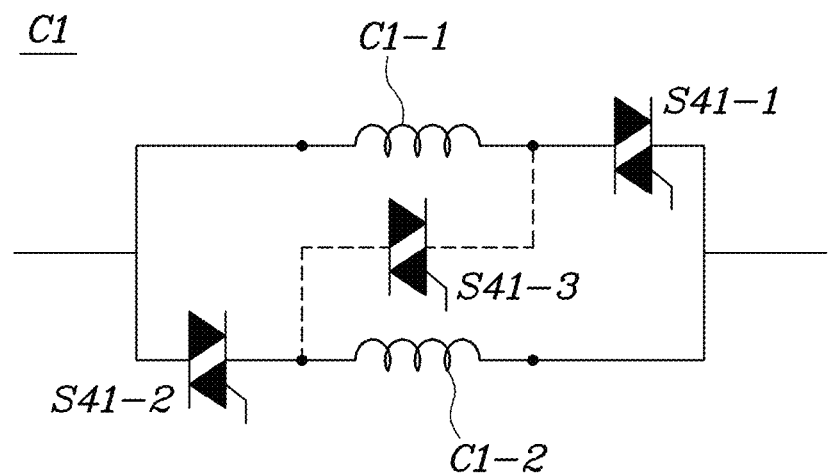
FIG. 4 shows a parallel connection state of the windings of the motor according to the exemplary embodiment of the present disclosure.

FIG. 4 shows a parallel connection state of the winding portions of the motor according to the exemplary embodiment of the present disclosure Referring to FIG. 4, when in the first winding portion C1, the 4-1 switching element S41-1 and the 4-2 switching element S41-2 are turned on and the 4-3 switching element S41-3 is turned off, the two coils C1-1 and C1-2 may be connected in parallel with each other. Accordingly, in the instant state in the instant state, assuming that the inductance of each of the two coils C1-1 and C1-2 is the same, the inductance of the first winding portion C1 may be half the inductance of one coil of the two coils.

As described with reference to FIG. 3 and FIG. 4, the state of connection between the internal coils of each of the winding portions C1, C2 and C3 is changed to change the inductance of each of the winding portions. Accordingly, as the inductance of the winding portion increases, a large torque may be generated even with a relatively low current to increase motor efficiency, and as the inductance of the winding portion decreases, the back electromotive force of the motor is reduced to improve a maximum output, so according to characteristics required for the motor according to a driving situation, advantages according to the connection state of each of the internal coils may be used.

Finally, the motor driving apparatus according to the exemplary embodiment of the present disclosure may perform conversion between the CEW mode and the OEW mode, and may change the inductance of each of the winding portions C1, C2 and C3 of the motor 40 through series/parallel connection change of internal coils, and thus may implement a total of four drive modes through the combination of CEW-OEW and series-parallel modes.

The method of controlling the motor driving apparatus of the realization of the four drive modes will be described with reference to FIG. 5.

Figure 5:
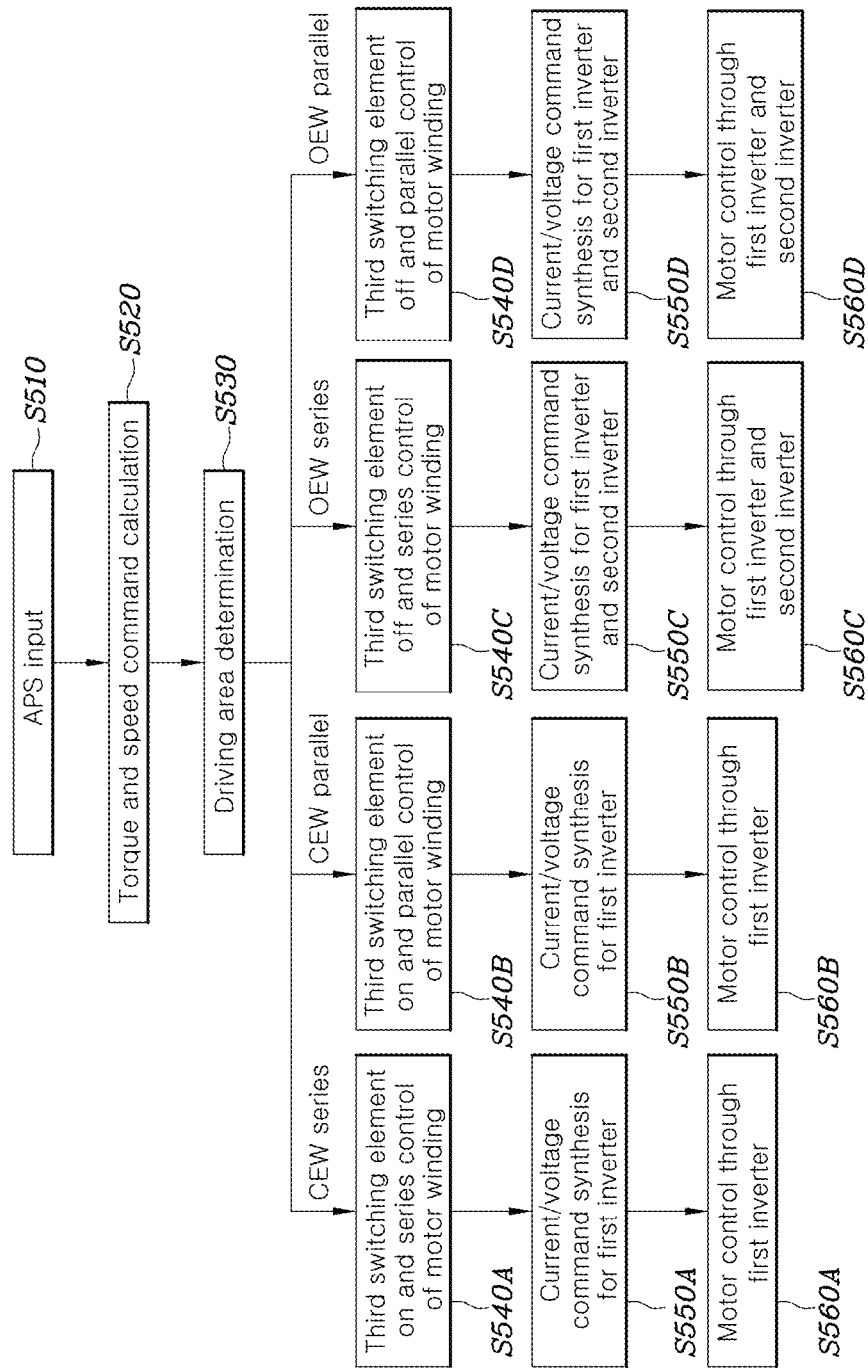
FIG. 5 is a flowchart showing an example of a motor control process according to the exemplary embodiment of the present disclosure.

FIG. 5 is a flowchart showing an example of a motor control process according to the exemplary embodiment of the present disclosure Referring to FIG. 5, in a motor control method according to the exemplary embodiment of the present disclosure, when the motor start to be driven, the controller 70 may start controlling the motor by receiving the required output (required torque) of the motor 40 from the superior controller of the outside.

The superior controller is configured to receive the value of accelerator pedal position sensor (APS) at S510, and based on this, may determine torque or output required by a driver. To satisfy the determined required torque or output, the superior controller may be configured to determine torque and revolutions per minute (rpm) commands for the motor 40 to transmit the determined torque and RPM commands to the controller 70 at S520. Here, the superior controller may be a vehicle control unit (VCU) in case of an electric vehicle (EV) and may be a hybrid control unit (HCU) in case of a hybrid vehicle (HEV), but this is illustrative and not necessarily limited thereto.

The controller 70 may determine the driving area of the motor 40, that is, a drive mode thereof, based on command transmitted from the superior controller at S530.

For example, when a high torque higher than a preset torque standard is required and in a low speed situation in which the speed is a preset speed standard (vehicle speed or motor RPM) or less, the controller 70 may determine a CEW series mode as a drive mode.

Furthermore, when a high output higher than a preset output standard and a low torque equal to or less than a preset torque standard are required and in a low speed situation, the controller 70 may determine a CEW parallel mode as a drive mode.

Furthermore, when a high output and high torque are required and in a high-speed situation higher than a preset speed standard, the controller 70 may determine an OEW series mode as a drive mode.

Additionally, when a high output and low torque are required and in a high-speed condition, the controller 70 may determine an OEW parallel mode as a drive mode.

However, it is apparent to those skilled in the art that the determination criteria of the drive modes described above are exemplary and may be variously modified, and each of the torque standard, the output standard, and the speed standard may also be determined through tests or simulations in consideration of the performance and characteristics of a power electric (PE) system.

When the CEW series mode is determined, the controller 70 may turn on the third switching elements S31, S32 and S33 and may control the fourth switching elements so that the internal connection state of each of the winding portions C1, C2 and C3 of the motor 40 is in series at S540A. For example, the controller 70 may turn off the 4-1 switching elements S41-1, S42-1, and S43-1 and the 4-2 switching elements S41-2, S42-2, and S43-2 in the winding portions C1, C2 and C3, respectively, and may turn on the 4-3 switching elements S41-3, S42-3, and S43-3 in the winding portions C1, C2 and C3, respectively.

Accordingly, the controller 70 may synthesize the current and voltage commands of the first inverter 10 at S550A, and may control the motor through the first inverter 10 at S560A.

Unlike this, when the CEW parallel mode is determined, the controller 70 may turn on the third switching elements S31, S32 and S33 and may control the fourth switching elements so that the internal connection state of each of the winding portions C1 and C2 of the motor 40 is in parallel at S540B. For example, the controller 70 may turn on the 4-1 switching elements S41-1, S42-1, and S43-1 and the 4-2 switching elements S41-2, S42-2, and S43-2 in the winding portions C1, C2 and C3, respectively, and may turn off the 4-3 switching elements S41-3, S42-3, and S43-3 in the winding portions C1, C2 and C3, respectively.

Accordingly, the controller 70 may synthesize the current and voltage commands of the first inverter 10 at S550B and may control the motor through the first inverter 10 at S560B.

Furthermore, when the OEW series mode is determined, the controller 70 may turn off the third switching elements S31, S32 and S33 and may control the fourth switching elements so that the internal connection state of each of the winding portions C1, C2 and C3 of the motor 40 is in series at S540C.

Accordingly, the controller 70 may synthesize the current and voltage commands of the first inverter 10 and the second inverter 20 at S550C and may control the motor through the first inverter 10 and the second inverter 20 at S560C.

Furthermore, when the OEW parallel mode is determined, the controller 70 may turn off the third switching elements S31, S32 and S33, and may control the fourth switching elements so that the internal connection state of each of the winding portions C1 and C2 of the motor 40 is in parallel at S540D.

Accordingly, the controller 70 may synthesize the current and voltage commands of the first inverter 10 and the second inverter 20 at S550D and may control the motor through the first inverter 10 and the second inverter 20 at S560D.

Hereinafter, the effect of the motor driving apparatus according to the exemplary embodiment of the present disclosure will be described with reference to FIGS. 6 to 8.

Figure 6:
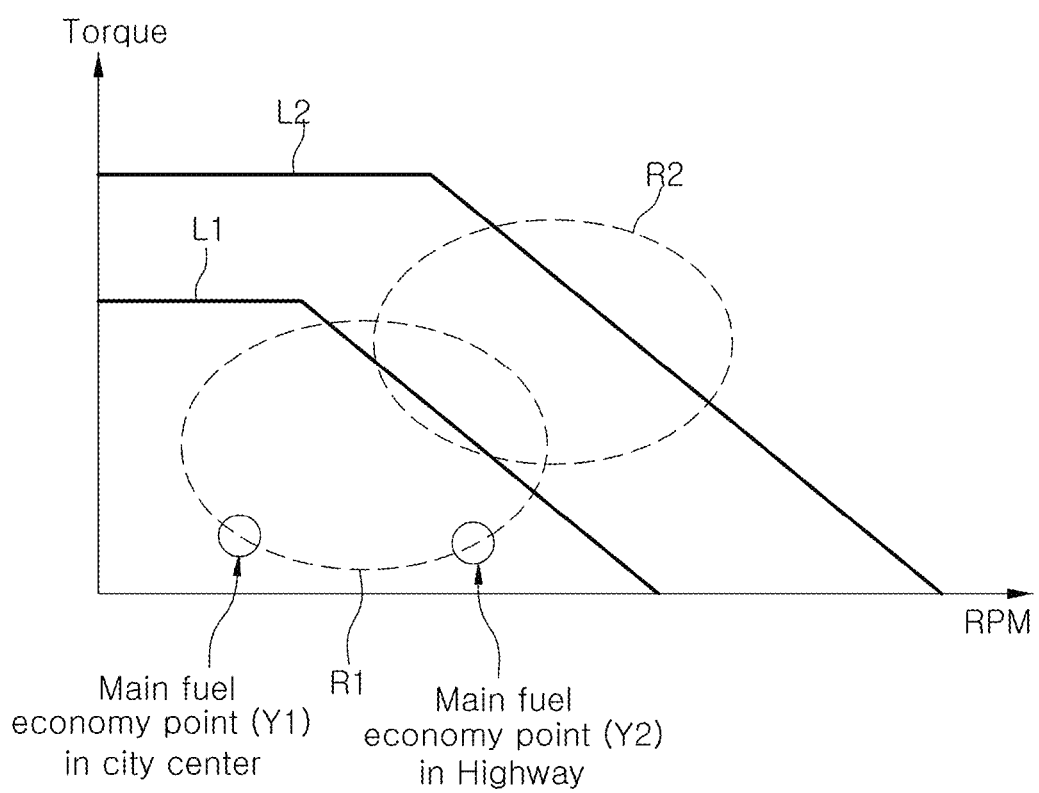
FIG. 6 is a graph showing a rotation speed (RPM)-torque curve and a high-efficiency region for each drive mode according to the connection state of each of the winding portions of the motor of the motor driving apparatus according to the exemplary embodiment of the present disclosure.

FIG. 6 is a graph showing a rotation speed (RPM)-torque curve and a high-efficiency region for each drive mode according to the connection state of each of the winding portions of the motor of the motor driving apparatus according to the exemplary embodiment of the present disclosure.

FIG. 6 illustrates characteristics of the motor according to whether the connection state of each of the winding portions C1, C2 and C3 of the motor is OEW or CEW assuming that each of the winding portions C1, C2 and C3 of the motor 40 has a single inductance.

In FIG. 6, L1 represents the maximum torque line of the motor 40 in the CEW mode, and L2 represents the maximum torque line of the motor 40 in the OEW mode.

As illustrated in FIG. 6, when the motor 40 is applied to driving a vehicle, main vehicle driving points appear as a driving point (Y1) during city driving and a driving point (Y2) during highway driving, and these driving points Y1 and Y2 are included in a region with high efficiency of the motor and inverter system.

When the inductance of each of the winding portions C1, C2 and C3 is fixed when the motor 40 is applied to a vehicle, in a situation in which a relatively low torque is required, a region R1 predetermined to have high efficiency of a motor and inverter system in the CEW mode is designed to include the main driving points Y1 and Y2 of the vehicle. However, in the instant case, due to the fixed inductance of the motor, it is difficult to include the main driving points Y1 and Y2 in an area R2 predetermined to have high efficiency of the motor and inverter system in the OEW mode, but when required output is high, the OEW mode is inevitably selected to satisfy this.

However, according to the exemplary embodiment of the present disclosure, even in a situation of each of the CEW mode and the OEW mode, the inductance of each of the winding portions C1, C2 and C3 may be changed by changing the state of connection between the internal coils of the winding portions C1, C2 and C3.

Figure 7:
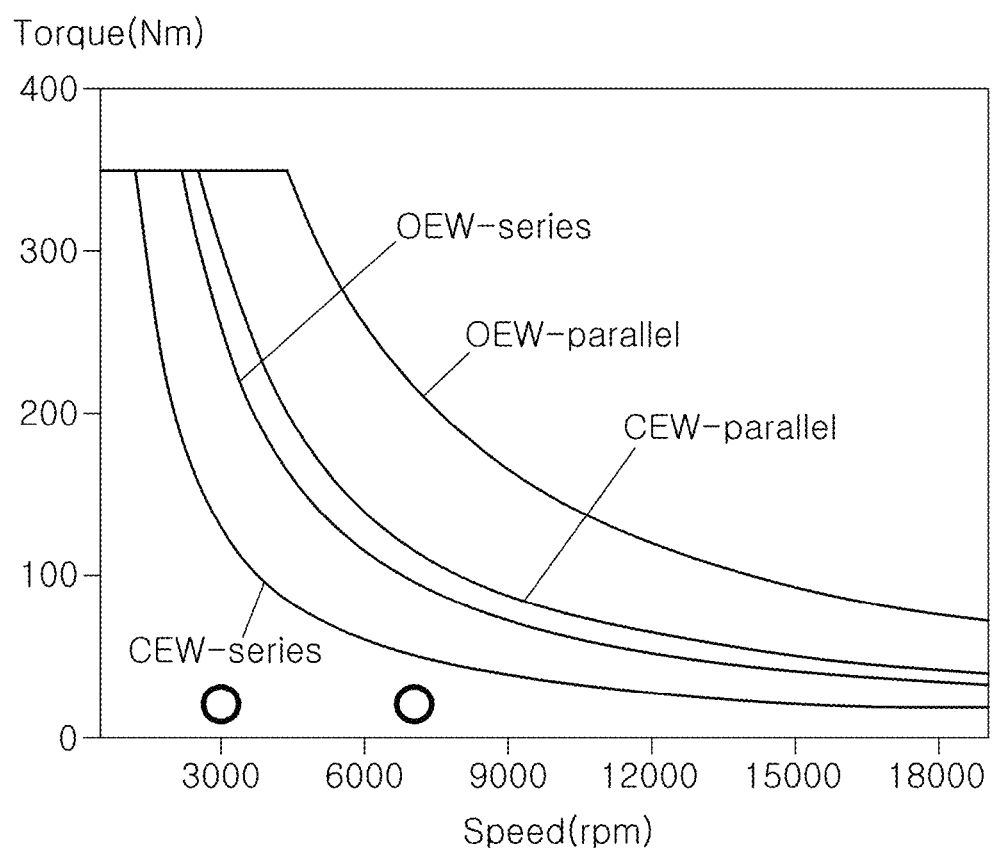
FIG. 7 shows a rotation speed (RPM)-torque curve for each motor drive mode according to the exemplary embodiment of the present disclosure.

FIG. 7 shows a rotation speed (RPM)-torque curve for each motor drive mode according to the exemplary embodiment of the present disclosure.

Referring to FIG. 7, it may be seen that RPM-torque characteristics for four modes are different from each other. Accordingly, the four modes are appropriately selected to achieve a performance optimized for a driving situation.

For example, in case of a CEW series mode, a maximum output is small but motor inductance may be increased, which improves efficiency and reduces an inverter current. Additionally, in case of the OEW parallel mode, the largest output may be made, which causes an effect of increasing a vehicle power performance. Furthermore, in case of the CEW parallel mode and the OEW series mode, according to the realization of variable inductance of the motor, RPM-torque characteristics are realized, which may bring about efficiency improvement (the increase of AER) optimized for an associated output point.

Figure 8:
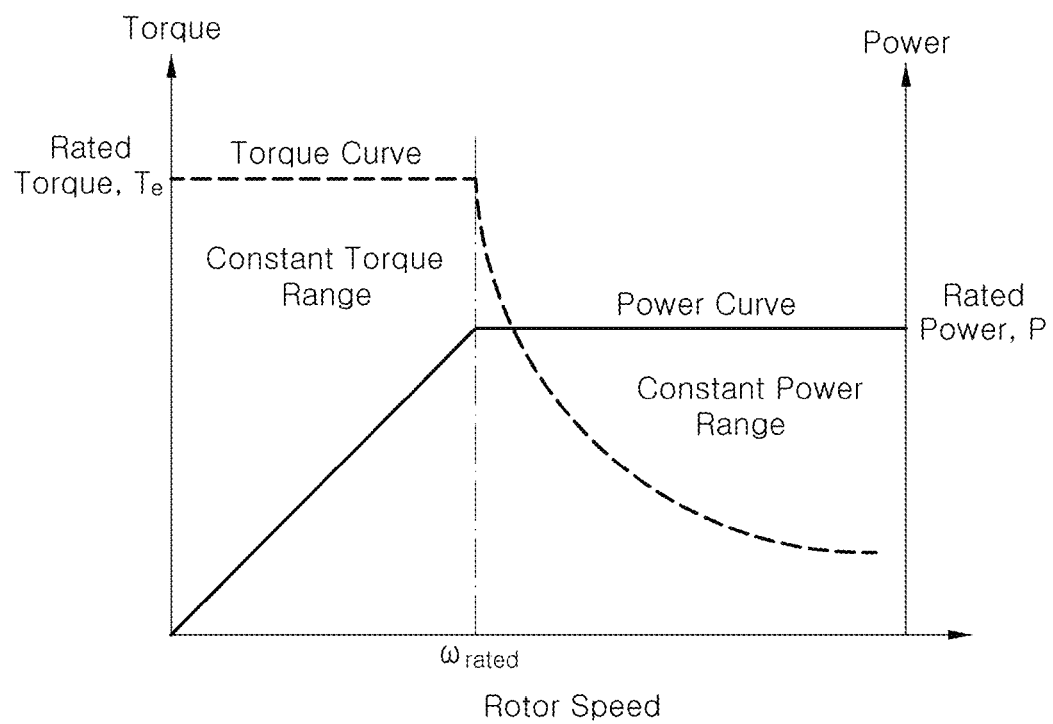
FIG. 8 shows torque and power characteristics according to the speed of the motor according to the exemplary embodiment of the present disclosure.

FIG. 8 shows torque and power characteristics according to the motor speed according to the exemplary embodiment of the present disclosure.

Referring to FIG. 8, when the maximum current of an inverter is maintained in a section of a predetermined number of rotation @rated of the motor or less, maximum torque may be output, and thus when a CEW series mode is selected in a low-speed and high-torque section, motor inductance may increase to improve torque. Accordingly, it is possible to increase a vehicle's rapid acceleration starting performance and improve towing ability thereof by selecting the CEW series mode.

Furthermore, it may be seen that when the maximum current of the inverter is maintained in the OEW parallel mode, the output of the motor system is the most significantly improved due to the reduction of the back electromotive force of the motor.

As described above, the motor driving apparatus according to various embodiments of the present disclosure may convert a motor drive mode into a plurality of motor drive modes according to the internal connection state of the winding portion of the motor and the connection state of each of the opposite ends of the winding portion according to a driving condition and a required performance, improving efficiency and output.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A motor driving apparatus comprising:
   a motor including a plurality of winding portions corresponding to a plurality of phases, respectively;
   a first inverter including a plurality of first switching elements and electrically connected to a first end of each of the winding portions;
   a second inverter including a plurality of second switching elements and electrically connected to a second end of each of the winding portions;
   a plurality of third switching elements including first ends electrically connected to the second ends of the plurality of winding portions, respectively, and second ends electrically connected to each other; and
   a controller,
   wherein each of the winding portions includes:
      a plurality of coils, and
      a plurality of fourth switching elements configured to change connection state between the plurality of coils,
   wherein the controller is configured to control ON/OFF states of the plurality of first switching elements, the plurality of second switching elements, the plurality of third switching elements and the plurality of fourth switching elements based on at least one of a required output, a required torque, and a required speed of the motor, and
   wherein each of the fourth switching elements selectively allows or blocks bidirectional current flows between first and second ends thereof.

2. The motor driving apparatus of claim 1, wherein the controller is further configured to control the plurality of fourth switching elements so that the plurality of coils is connected in parallel or in series with each other.

3. The motor driving apparatus of claim 2,
wherein each of the winding portions includes a first coil and a second coil located between first and second ends of a corresponding winding portion and connected in parallel with each other, and
wherein the plurality of fourth switching elements include:
a 4-1 switching element located between the first coil and the second end of the corresponding winding portion and connected in series with the first coil;
a 4-2 switching element located between the first end of the corresponding winding portion and the second coil connected in series with the second coil; and
a 4-3 switching element including a first end electrically connected to a position between the first coil and the 4-1 switching element, and a second end electrically connected to a position between the 4-2 switching element and the second coil.

4. The motor driving apparatus of claim 3, wherein when connecting the plurality of coils in parallel with each other, the controller is further configured to control the 4-1 switching element and the 4-2 switching element to be turned on, and control the 4-3 switching element to be turned off.

5. The motor driving apparatus of claim 3, wherein when connecting the plurality of coils in series with each other, the controller is further configured to control the 4-1 switching element and the 4-2 switching element to be turned off, and control the 4-3 switching element to be turned on.

6. The motor driving apparatus of claim 2, wherein when the required torque is higher than a preset torque standard and the speed is a preset speed standard or less than the preset speed standard, the controller is further configured to turn on the plurality of third switching elements and control the fourth switching elements so that the plurality of coils is connected in series with each other, and drive the motor by performing pulse width modulation control of the plurality of first switching elements.

7. The motor driving apparatus of claim 2, wherein when the required torque is a preset torque standard or less than the preset torque standard, the required output is higher than a preset output standard, and the speed is a preset speed standard or less than the preset speed standard, the controller is further configured to turn on the plurality of third switching elements and control the fourth switching elements so that the plurality of coils is connected in parallel with each other, and drive the motor by performing pulse width modulation control of the plurality of first switching elements.

8. The motor driving apparatus of claim 2, wherein when the required torque is higher than a preset torque standard, the required output is higher than a preset output standard, and the speed is higher than a preset speed standard, the controller is further configured to turn off the plurality of third switching elements and to control the fourth switching elements so that the plurality of coils is connected in series with each other, and configured to drive the motor by performing pulse width modulation control of each of the first switching elements and the plurality of second switching elements.

9. The motor driving apparatus of claim 2, wherein when the required torque is a preset torque standard or less than the preset torque standard, the required output is higher than a preset output standard, and the speed is higher than a preset speed standard, the controller is further configured to turn off the plurality of third switching elements and control the fourth switching elements so that the plurality of coils is connected in parallel with each other, and drive the motor by performing pulse width modulation control of each of the first switching elements and the plurality of second switching elements.

10. A method of controlling the motor driving apparatus of claim 2, the method comprising:
when the required torque is higher than a preset torque standard and the speed is a preset speed standard or less than the preset speed standard, turning on the plurality of third switching elements and controlling the fourth switching elements so that the plurality of coils is connected in series with each other, and driving the motor by performing pulse width modulation control of the plurality of first switching elements, by the controller.

11. The method of claim 10, further including:
when the required torque is a preset torque standard or less than the preset torque standard, the required output is higher than a preset output standard, and the speed is a preset speed standard or less than the preset speed standard, turning on the plurality of third switching elements and controlling the fourth switching elements so that the plurality of coils is connected in parallel with each other, and driving the motor by performing pulse width modulation control of the plurality of first switching elements, by the controller.

12. The method of claim 10, further including:
when the required torque is higher than a preset torque standard, the required output is higher than a preset output standard, and the speed is higher than a preset speed standard, turning off the plurality of third switching elements and controlling the fourth switching elements so that the plurality of coils is connected in series with each other, and driving the motor by performing pulse width modulation control of each of the first switching elements and the plurality of second switching elements, by the controller.

13. The method of claim 10, further including:
when the required torque is a preset torque standard or less than the preset torque standard, the required output is higher than a preset output standard, and the speed is higher than a preset speed standard, turning off the plurality of third switching elements and controlling the fourth switching elements so that the plurality of coils is connected in parallel with each other, and driving the motor by performing pulse width modulation control of each of the first switching elements and the plurality of second switching elements, by the controller.

\* \* \* \* \*